United States Patent
Qi et al.

(10) Patent No.: US 11,948,068 B2
(45) Date of Patent: Apr. 2, 2024

(54) BRAIN MACHINE INTERFACE DECODING METHOD BASED ON SPIKING NEURAL NETWORK

(71) Applicant: ZHEJIANG UNIVERSITY, Hangzhou (CN)

(72) Inventors: Yu Qi, Hangzhou (CN); Tao Fang, Hangzhou (CN); Gang Pan, Hangzhou (CN); Yueming Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/913,079

(22) PCT Filed: Oct. 27, 2021

(86) PCT No.: PCT/CN2021/126579
§ 371 (c)(1),
(2) Date: Sep. 20, 2022

(87) PCT Pub. No.: WO2022/257329
PCT Pub. Date: Dec. 15, 2022

(65) Prior Publication Data
US 2023/0289575 A1    Sep. 14, 2023

(30) Foreign Application Priority Data

Jun. 8, 2021 (CN) .......................... 202110636399.2

(51) Int. Cl.
*G06N 3/04* (2023.01)
*G06N 3/049* (2023.01)
(52) U.S. Cl.
CPC .................................. *G06N 3/049* (2013.01)
(58) Field of Classification Search
CPC ..................................................... G06N 3/049
See application file for complete search history.

(56) References Cited

U.S. PATENT DOCUMENTS

2012/0011090 A1* 1/2012 Tang ..................... G06N 3/088
706/33
2019/0042909 A1* 2/2019 Sumbul ................... G06N 3/08

FOREIGN PATENT DOCUMENTS

CN      110751032      2/2020
CN      111783973      10/2020
(Continued)

*Primary Examiner* — Omar F Fernandez Rivas
*Assistant Examiner* — Tri T Nguyen
(74) *Attorney, Agent, or Firm* — Jiwen Chen; Joywin IP Law PLLC (57) ABSTRACT

The present invention discloses a brain machine interface decoding method based on spiking neural network, comprising: (1) constructing a liquid state machine model based on a spiking neural network, the liquid state machine model consists of an input layer, an middle layer and an output layer, wherein, a connection weight from the input layer to the middle layer is $W_{hh}$, a loop connection weight inside the middle layer is $W_{hh}$, a readout weight from the middle layer to the output layer is $W_{yh}$; (2) Inputting a neuron spike train signal, and training each weight with the following strategy: (2-1) Using STDP without supervision to train the connection weight $W_{hh}$ from the input layer to the middle layer; (2-2) Setting the loop connection weight $W_{hh}$ inside the middle layer by means of distance model and random connection, and obtaining a middle layer liquid information R(t); (2-3) Using ridge regression with supervision to train the readout weight $W_{yh}$ from the middle layer to the output layer, and establishing a mapping between the middle layer liquid information R(t) and the output motion information, and finally outputting a predicted motion trajectory. The present invention can quickly train a model in a relatively short time, predict the arm motion trajectory in real time, and achieve an improvement in efficiency and accuracy.

3 Claims, 2 Drawing Sheets

(56) References Cited

FOREIGN PATENT DOCUMENTS

| | | |
|---|---|---|
| CN | 112405542 | 2/2021 |
| CN | 112784976 | 5/2021 |
| WO | WO2020115746 | 6/2020 |

\* cited by examiner

BRAIN MACHINE INTERFACE DECODING METHOD BASED ON SPIKING NEURAL NETWORK

This is a U.S. national stage application of PCT Application No. PCT/CN2021/126579 under 35 U.S.C. 371, filed Oct. 27, 2021 in Chinese, claiming priority of Chinese Application No. 202110636399.2, filed Jun. 8, 2021, all of which are hereby incorporated by reference.

FIELD OF TECHNOLOGY

The present invention belongs to the field of invasive action potential brain signal analysis, in particular to a brain machine interface decoding method based on a spiking neural network.

BACKGROUND TECHNOLOGY

Brain Machine Interface (BMI) system is a method that directly establishes the connection path between the brain and external equipment without relying on the human muscle system. The BMI is responsible for collecting and analyzing the electrical signals of neural activity output by the brain, and converting them into control signals for external devices or prosthetics (computer cursors, robotic arms, etc.), so that the human brain can directly interact with the device and bypass the nervous and muscular systems. The ultimate goal of the development of BMI is to restore the loss of human motor function in patients due to accidental injury.

At present, with the development of invasive multi-electrode array technology, the BMI system has achieved high performance in decoding pulsed electrical signals to predict motion information. Many BMI decoding studies use shallow models to decode neural signals, including Wiener filter (WF) and Kalman filter (KF), which have high decoding efficiency. In order to achieve higher motion signal decoding accuracy, more and more deep models are applied to motion signal analysis. Ahmadi et al. used long short-term memory network (LSTM) to decode the finger movement trajectory from the neural signals of the monkey brain motor area. Other deep models including Recurrent Neural Networks (RNN) and Gated Recurrent Unit are also applied to motion analysis.

Spiking Neural Networks (SNNs) are known as the third generation of artificial neural networks (Artificial Neural Networks, ANNs), and are composed of biomimetic neurons such as Integrate-And-Fire (IF) or Leaky Integrate-And-Fire (LIF), the information is represented and transmitted according to the neuron pulse firing time. At present, it has been widely used in image classification, music recognition and other issues.

For example, Chinese patent application with publication number CN112906828A discloses an image classification method based on time domain coding and spiking neural network. The method comprises: S1. Constructing a sample set based on image time-domain coding and category labeling; S2. Constructing a spiking neural network as a classification model; S3. Using the constructed sample set to train the spiking neural network to obtain a mature trained spiking neural network; S4. For the image to be recognized, it is encoded in the time domain and then input into the trained and mature spiking neural network to obtain the classification result of the image.

Compared with ANN, SNN has stronger computing power, anti-noise and better biological interpretability, and spiking neurons can directly process the temporal information carried by spiking signals, preventing the loss of temporal information from ANN frequency coding, predicting more accurate. At present, SNN does not have a unified training algorithm. The known classic algorithms include Tempotron, SpikeProp, ReSuMe and other single-layer or multiple-layer SNN training algorithms.

At present, there is no algorithm for decoding animal movement trajectories based on the motor nerve signals of the spiking neural network.

SUMMARY OF THE INVENTION

The present invention provides a brain machine interface decoding method based on a spiking neural network, which can quickly train a model in a relatively short period of time, predict the arm motion trajectory in real time, and achieve an improvement in efficiency and accuracy compared with the classical method.

A brain machine interface decoding method based on a spiking neural network, where the method comprises the following steps:

(1) Constructing a liquid state machine model based on a spiking neural network, the liquid state machine model consists of an input layer, a middle layer and an output layer, wherein, a connection weight from the input layer to the middle layer is $W_{hh}$, a loop connection weight inside the middle layer is $W_{hh}$, a readout weight from the middle layer to the output layer is $W_{yh}$.

(2) Inputting a neuron spike train signal, and training each weight with the following strategy:

(2-1) Using Spike-timing-dependent plasticity (STDP) without supervision to train the connection weight $W_{hh}$ from the input layer to the middle layer.

(2-2) Setting the loop connection weight $W_{hh}$ inside the middle layer by means of distance model and random connection, and obtaining a middle layer liquid information $R(t)$.

(2-3) Using the middle layer liquid information as an input, and using ridge regression with supervision to train the readout weight $W_{yh}$ from the middle layer to the output layer, and establishing a mapping between the middle layer liquid information $R(t)$ and the output motion information, and finally outputting a predicted motion trajectory.

Preferably, where in the step (2-1), using the trace of the pre- and post-neuron synapses to achieve STDP optimization the connection weight $W_{hh}$ from the input layer to the middle layer, the trace is the accumulation of the decaying pulse signal, and the formula is:

$$T_{pre}(t) = U(t) + T_{pre}(t-1)e^{-\frac{1}{\tau}}$$

$$T_{post}(t) = X(t) + T_{post}(t-1)e^{-\frac{1}{\tau}}$$

Wherein, U and X are pulses fired by the input layer and middle layer, respectively, $T_{pre}(t)$ and $T_{post}(t)$ are the traces accumulated by the pre-synapse and the post-synapse at time t due to pulse firing, respectively, and $\tau$ parameter is the decay factor, controlling the speed of trace decay when the trace is accumulated, the STDP algorithm using trace optimization is:

$$W_{hx}(i,j) = W_{hx}(i,j) - \text{lr} \times \Delta W_{hx}(i,j)$$

Wherein, lr is the learning rate, the weight update amount $\Delta W_{hx}(i,j)$ between neurons I and j is:

$$\Delta W_{hx}(i,j) = \begin{cases} W_{hx}(i,j) - W_{min}, & W_{hx}(i,j) > 0 \text{ and } T_{pre} < T_{up} \\ W_{hx}(i,j) + W_{min}, & W_{hx}(i,j) < 0 \text{ and } T_{pre} < T_{up} \\ W_{hx}(i,j) - W_{max}, & W_{hx}(i,j) > 0 \text{ and } T_{pre} > T_{down} \\ W_{hx}(i,j) + W_{max}, & W_{hx}(i,j) < 0 \text{ and } T_{pre} > T_{down} \end{cases}$$

Wherein, $T_{up}$ and $T_{down}$ are the upper and lower target values of the traces of the pre-synapses, respectively, $W_{max}$ and $W_{min}$ are the maximum/minimum value of the weight change caused by STDP optimization, and taking the maximum value of $W_{hx}$ and 0.0.

When the post-synapse neuron fires pulses, the traces of the pre-synapses are detected, when the current accumulated traces of the pre-synapses $T_{pre}(t)$ is greater than $T_{up}$, it is considered that there is a significant causal relationship between the pre-synapses pulse train and the post-synapse pulse firing in the current period of time, and enhance its corresponding weight, when the $T_{pre}(t)$ is lesser than $T_{up}$, it is considered that the pre-synapses is not directly related to the post-synapse pulse firing in the current period of time, and weaking the weight or disconnect.

Preferably, the specific process of step (2-2) is:

Initializing the connection weight $W_{hh}$ as a two-dimensional matrix with a standard normal distribution:

$W_{hh} \sim N(0,1)$

Scaling the normalized $W_{hh}$,

Setting the pool in the middle layer as a three-dimensional structure, the pool is composed of multiple cubes with a side length of 1, each neuron is distributed at the vertex of the cube, then judging whether there is a connection based on the Euclidean distance between two points of the neuron, and breaking connection between distant neurons.

Preferably, the specific way to judge whether there is a connection based on the Euclidean distance between two points of the neuron is:

$W_{hh}$ is a square matrix in [N, N], where N is the number of neurons in the middle layer, and the element $w_{ij}$ defines the size of the connection between neuron j and neuron i, whether the connection between neurons i and j obeys probability:

$$p(i,j) = Ce^{-\frac{D(i,j)}{\lambda}}$$

Wherein, the parameter $\lambda$ defaults to 2, C defaults to 1.0, D(i,j) function is a distance function, which measures the distance between neurons I and j, using the square of the Euclidean distance, the formula is:

$D(i,j) = (pos(i) - pos(j))^2$.

Preferably, the specific process of step (2-3) is:

When training the connection weight $W_{yh}$ from the middle layer to the output layer, fixing the generated input layer $W_{hx}$ and middle layer $W_{hh}$ connection, when the data arrives, calculating the real-time update of the middle layer neuron membrane potential:

$V(t) = V(t-1) + f(w_{hx}U(t)) + f(W_{hh}X(t-1))$

Wherein, $f(W_{hx}U(t))$ is the current contribution of the input layer pulse to the post-synapses neuron, and $f(W_{hh}X(t-1))$ is the current contribution of the pulses fired in the past in the middle layer loop synapse to the current moment.

Calculating the output pulse $X_i(t)$ of the ith neuron in the middle layer:

$$X_i(t) = \begin{cases} 1, & V_i(t) \geq V_{thres} \\ 0, & V_i(t) < V_{thres} \end{cases},$$

Wherein, $V_{thres}$ is the membrane potential firing threshold, $V_i(t)$ is the membrane potential of the i-th neuron in the middle layer at time t, when the neuron membrane potential exceeds the threshold, a pulse is fired, then $V_i(t) = V_{rest}$ is set back to the resting voltage, waiting for the next accumulation-distribution event.

The expression formula of the middle layer liquid information R(t) is:

$$R(t) = X(t) + R(t-1)e^{-\frac{1}{\tau}}$$

Wherein, $\tau$ parameter is the decay factor, controlling the speed of trace decay, the smaller the $\tau$, the smaller the impact of the pulses fired in the past on the current moment.

Assuming that the influence of the pulse at time $t_i$ on the current time has attenuated to less than K, the influence is considered to disappear, then the length of the influence window corresponding to the $\tau$ parameter is:

$T_\tau = -\tau \ln K$

When K=0.05, $T_\tau \approx 3.21 * \tau$, that is, the liquid state at the current moment is affected by at most $3.21\tau$ time windows. In the present invention, the value of $\tau$ is 4 times the time window value.

The middle layer neurons use the cumulative firing model IF, which is the accumulation and characteristic expression of short-term input pulse signals, and the motion trajectory data is highly correlated with the past neural signals, so a trace-based cumulative liquid representation method with a higher $\tau$ decay variable is used, and is complementary to the long-term information representation, so it is sufficient to obtain similar results to the deep regression model on such a simple shallow model.

The optimization objective function using ridge regression with supervision training is:

$$J(W_{yh}) = \sum_t (Y(t) - W_{yh}R(t)) + \lambda_R \|W_{yh}\|_2^2$$

Wherein, $\Sigma_t(Y(t) - W_{yh}R(t))$ is used to reduce the deviation between the task objective and the prediction, and $\lambda_R \|W_{yh}\|_2^2$ is a penalty item, responsible for minimizing the variance of the parameter $W_{yh}$, $\lambda_R$ is the weight coefficient, which is used to control the proportion of penalty items and is responsible for balancing the prediction deviation and variance. In the present invention, the membrane potential firing threshold $V_{thres} = 0.15$, the weight coefficient $\lambda_R = 20$.

The trained connection weight $W_{yh}$ is fixed for real-time motion signal prediction:

$Y(t) = W_{yh}R(t)$.

Compared with the prior art, the present invention has the following beneficial effects:

1. The present invention adopts the liquid state machine model based on the spiking neural network, directly analyzes the discrete pulse signal and predicts the motion trajectory according to the state of the middle layer of the network. Compared with deep models such as RNN, the decoding accuracy rate of the model algorithm is smaller but has a similar decoding effect.

2. The training strategy of the present invention ensures the model training efficiency (the maximum amount of computation is only the output layer supervision training), and at the same time enables the model to fully optimize the connection weights for the two data domains, and the results show that this method can achieve higher accuracy.

DETAILED DESCRIPTION OF THE EMBODIMENTS

The present invention will be further described in detail below with reference to the accompanying drawings and embodiments. It should be pointed out that the following embodiments are intended to facilitate the understanding of the present invention, but do not have any limiting effect on it.

In the present invention, the invasive electrode was used to capture the action potential activity of the monkey brain motor area neuron in the experiment, and recorded it as a pulse sequence signal. By analyzing the brain pulse signals, it was possible to decode the corresponding movement state of the animal.

The present invention adopts the liquid state machine model based on the spiking neural network, directly analyzes the discrete impulse signal and predicts the motion trajectory according to the state of the middle layer of the network.

Liquid State Machine (LSM) and echo state network belong to the pool computing model, which is a kind of recurrent neural network computing framework suitable for time series data processing. The basic principle is to map the input data to a higher-dimensional middle layer (water pool) to achieve feature expression, and train a Readout Weight to read and analyze the liquid from the high-dimensional space to achieve regression or classification.

The liquid state machine is a single hidden layer spiking neural network. The network is mainly composed of input neurons U, a middle layer (water pool, also called liquid layer) X and output layer neurons Y. The neurons are all bionic neurons (such as LIF or IF neurons). In the present invention, the IF bionic neuron is preferably used, and the neuron membrane potential accumulation formula is:

$V(t)=V(t-1)+I(t)$

Wherein, I(t) is the current contribution of the pre-synapse neuron connected to the neuron to the post-synapse neuron at time t. When a neuron's membrane potential accumulates above a threshold $V_{thres}$, the neuron fires pulse and the membrane potential V(t) decreases to $V_{thres}$.

The main connection weights involved in the model are: a weight $W_{hx}$ from the input layer to the middle layer, a loop connection weight $W_{hh}$ inside the middle layer, and a readout weight $W_{yh}$ from the middle layer to the output layer.

The input layer current contribution is expressed as:

$I_{hx}(t)=f(W_{hx}U(i))$

The middle layer current contribution is expressed as:

$I_{hh}(t)=f(W_{hh}X(t-1))$

Wherein, U and X are pulse sequences fired by the input layer and the middle layer. $f(x)$ is the activation function applied to the output (current contribution) of each neuron. In the present invention, the tanh function is used, which is responsible for regulating the current contribution to the range of (−1,1). The tanh function is expressed as:

$$f(x) = \frac{e^x - e^{-x}}{e^x + e^{-x}}$$

Therefore, the middle layer neuron membrane potential:

$V(t)=V(t-1)+I_{hx}(t)+I_{hh}(t-1)$

Wherein, $I_{hx}(t)$ is the current stimulation caused by the input layer pulse, $I_{hh}(t)$ is the mutual stimulation current caused by the internal interconnection of the middle layer, that is, the current middle layer membrane potential and the past potential accumulation and the input layer and the middle layer current are related. Therefore, the neurons in the middle layer have a certain short-term memory ability for the past pulse signals.

Figure 1:
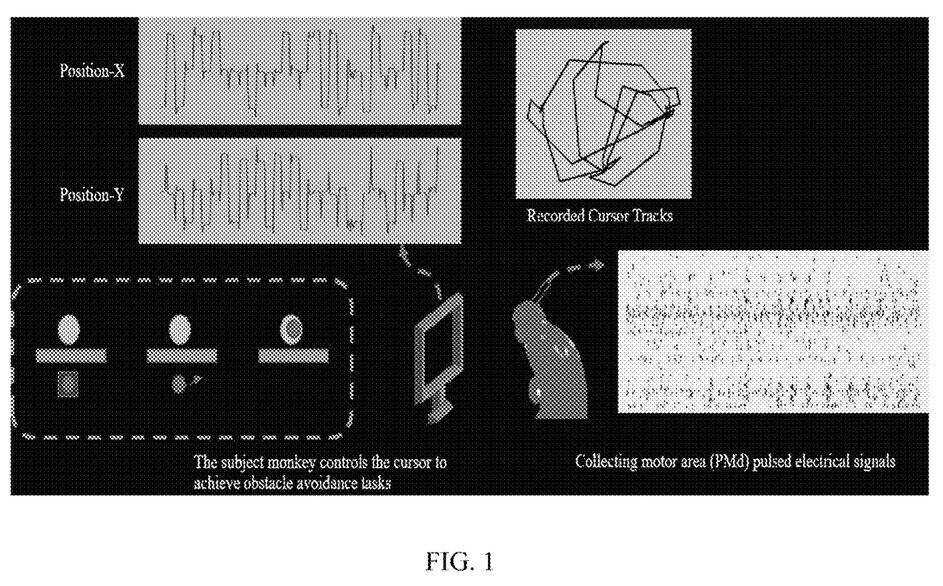
FIG. 1 is a schematic diagram of an animal experiment for motion signal decoding in the embodiment of the present invention.
Figure 2:
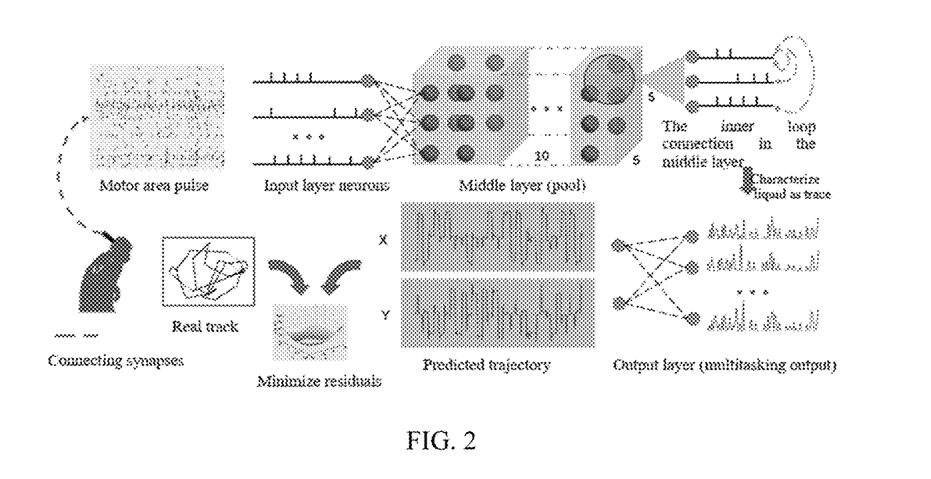
FIG. 2 is the framework diagram of the brain machine interface decoding method based on spiking neural network of the present invention.

As shown in FIG. 2, which is the architecture diagram of the method of the present invention, the specific process of the implementation of the present invention is described below:

(1) Collecting Monkey Brain Motor Area Data by Invasive Equipment

The present invention adopted experimental data collected in the document "Li, H., Hao, Y., Zhang, S., Wang, Y., Chen, W., & Zheng, X. (2017). Prior Knowledge of Target Direction and Intended Movement Selection Improves Indirect Reaching Movement Decoding. Behavioural Neurology, 2017."

In the experiment, two adult male rhesus monkeys were trained to use their upper limbs to achieve obstacle avoidance tasks. During the process, the monkey was fixed on the chair, and the monitor was placed in front of it. The monkey needed to control the cursor on the two-dimensional plane to bypass the obstacle (green bar) from the initial position to the end point in order to obtain the reward (water), as shown in FIG. 1.

The experiment used a 96-channel microelectrode array (10×10 matrix, 4.2×4.2 mm in size), which was implanted into the PMd of the motor area of the cerebral cortex of the monkeys. The monkeys performed the above experiments and collected data after at least one week of recovery.

The acquired analog waveform was first amplified, bandpass filtered (0.3 Hz to 7.5 kHz) by a Butterworth filter, then digitized (30 kHz frequency) and highpass filtered (250 Hz). The action potential pulse signal was then collected using the threshold method (minus 4.5 times the root mean square of the reference data).

In the present invention, the five-day data test was used, and the Spike sort method was not used for preprocessing, and the single-electrode channel was regarded as one or more neuron activity signal processing. The original high-frequency pulse signal was downsampled to 300 Hz data as the input of the liquid state machine. Although the motion status could be known by observing the state of the middle layer of the liquid state machine at any time, in order to compare with the classical algorithm (the number of pulses in a fixed time window needs to be counted as a feature), we set the detection frequency to 3 Hz, that was, read the predicted motion state from the liquid state machine every interval 0.33 s.

(2) Generating Liquid Layer Loop Connections

The middle layer cyclic connection $W_{hh}$ is set by means of distance model and random generation.

The connectivity matrix $W_{hh}$ is initialized as a two-dimensional matrix with a standard normal distribution (mean 0, variance 1):

$$W_{hh} \sim N(0,1),$$

In order to avoid that the value of $W_{hh}X(t)$ is too large, it tends to saturate in the activation function $f(x)$ and lose the discrimination, and to avoid the excessive current contribution resulting in excessively dense firing in the middle layer, it is necessary to scale the normalized $W_{hh}$ (scale is 0.004).

Then, according to the three-dimensional model, the distant neurons are disconnected, and the 01 matrix mask is generated. Setting the pool in the middle layer as a three-dimensional structure, the pool is composed of multiple cubes with a side length of 1, each neuron is distributed at the vertex of the cube, then judging whether there is a connection or disconnection based on the Euclidean distance between two points of the neuron. In the present invention, the number N of neurons in the middle layer is set to 250, and the middle layer connection matrix $W_{hh}$ is a square matrix in [N, N], and the element $w_{ij}$ defines the size of the connection between neuron j and neuron i, whether the connection between neurons i and j obeys probability:

$$p(i,j) = Ce^{-\frac{D(i,j)}{\lambda}}$$

Wherein, $D(i,j)$ function is a distance function, which measures the distance between neurons i and j, using the square of the Euclidean distance, the formula is:

$$D(i,j)=(pos(i)-pos(j))^2.$$

In the present invention, $\lambda=2$, and the same $C=1.0$ is chosen for all synapses for the simplified model. The above method is then applied to break the connections between distant neurons, so as to satisfy stable firing.

In the middle layer, the weights are randomly connected to reduce the amount of computation, and the optimization for the data and task objectives is handed over to $W_{hx}$ and $W_{yh}$ respectively.

(3) Pre-Training Input Layer Connection Without Supervision

The input layer weight mainly optimizes the input connection weight for the input pulse sequences. Because different data pulse frequencies and channel distributions are inconsistent, the present invention adopts the STDP (Spike-timing-dependent plasticity) algorithm to quickly optimize the input connection without supervision.

M is set as the number of input electrical signal channels, and the input $W_{hx}$ connection is initialized as a matrix of size [N, M] obeying a standard normal distribution. In order to prevent the problem of excessively dense firing of neurons in the middle layer due to the excessive weight of the input layer, $W_{hx}$ also needs to be scaled (the ratio is 0.02).

The STDP algorithm is a Hebb learning rule that adjusts connection weights based on the time difference between pre- and post-synapse neuron spikes. In the STDP algorithm, if the pre-synapse neuron fires before the post-synapse neuron, it is considered that there is a causal connection between the two and enhances the connection (Long-Term Potentiation, LTP), otherwise, the connection between the two is weakened (Long-Term Depression, LTD), the degree of enhancement or weakening is related to the pulse firing time difference between pre- and post-synapse.

In the present invention, the pulse time point is not directly used to optimize the synaptic weight, because the adjacent pulse judgment LTD/LTP will ignore the pulse information continuously emitted by the pre-synapse.—synapse:

$$T_{pre}(t) = U(t) + T_{pre}(t-1)e^{-\frac{1}{\tau}}$$

$$T_{post}(t) = X(t) + T_{post}(t-1)e^{-\frac{1}{\tau}}$$

Wherein, $T_{pre}(t)$ and $T_{post}(t)$ are the traces accumulated by the pre-synapse and the post-synapse due to the pulse firing at time t, respectively. The trace reflects the intensity of the current synaptic pulse firing in the recent period of time. Biologically can be interpreted as accumulation of neurotransmitter release. $\tau$ parameter is the decay factor, controlling the speed of trace decay, the smaller the $\tau$, the smaller the impact of the pulses fired in the past on the current moment. In the present invention, $\tau=400$.

The STDP algorithm using trace optimization is:

$$W_{hx}(i,j)=W_{hx}(i,j)-lr \times \Delta W_{hx}(i,j)$$

Wherein, the weight update amount $\Delta W_{hx}(i,j)$ between neurons i and j is:

$$\Delta W_{hx}(i,j) = \begin{cases} W_{hx}(i,j) - W_{min}, & W_{hx}(i,j) > 0 \text{ and } T_{pre} < T_{up} \\ W_{hx}(i,j) + W_{min}, & W_{hx}(i,j) < 0 \text{ and } T_{pre} < T_{up} \\ W_{hx}(i,j) - W_{max}, & W_{hx}(i,j) > 0 \text{ and } T_{pre} > T_{down} \\ W_{hx}(i,j) + W_{max}, & W_{hx}(i,j) < 0 \text{ and } T_{pre} > T_{down} \end{cases}$$

Wherein, $T_{up}$ and $T_{down}$ are the upper and lower target values of the traces of the pre-synapses, respectively. We detect traces of presynapses, when the current accumulated traces of the pre-synapses $T_{pre}(t)$ is greater than $T_{up}$, it is considered that there is a significant causal relationship between the pre-synapses pulse train and the post-synapse pulse firing in the current period of time. when the $T_{pre}(t)$ is lesser than $T_{up}$, it is considered that the pre-synapses is not directly related to the post-synapse pulse firing in the current period of time. $W_{max}$ and $W_{min}$ are the maximum/minimum value of the weight change caused by STDP optimization, and taking the maximum value of $W_{hx}$ and 0.0. Using this STDP logic, the connections with obvious correlation between the presynapses and postsynapses are strengthened, while the connections with no obvious correlation between the neuron firing before and after are weakened or even disconnected.

The selection of $T_{up}$ and $T_{down}$ in the present invention is related to specific data. Here we adopt a conservative numerical selection method to prevent excessive polarization of neuron connections caused by STDP training (a large number of connections are in the maximum/minimum state). Through our analysis of real neuronal signals, it was found that most of the channels were in a stable, low-firing frequency state, and fewer channels had high-frequency pulse signals. Due to the high correlation between motor area pulse decoding and pulse frequency (and neuron activity level), therefore, we believe that the high-frequency pulse channel carries more motion information than the low-frequency channel, focusing on strengthening the connection between the high-frequency channel and the frequent firing neurons in the middle layer, while weakening the corresponding connection in the low-frequency channel, so we calculate average value of the presynaptic traces in the $W_{hx}$ synapse connection matrix under the window size of $WIN_{stdp}$, and sort them in ascending order. The 3000th trace value is taken as $T_{down}$, the last 200th trace value is taken as $T_{up}$. Signals with traces greater than $T_{up}$ are judged as short-term high-frequency pulses, and STDP will enhance their corresponding weights, and vice versa.

(4) Training Output Layer Connection With Supervision

The training of the connection weight of the output layer is related to the task objective, and the output layer outputs the predicted motion trajectory Y. Therefore, $W_{yh}$ needs to be trained to establish the mapping between the middle layer liquid information R(t) and the output motion information Y(t).

When training the connection weight $W_{yh}$ from the middle layer to the output layer, fixing the generated input layer $W_{hx}$ and middle layer $W_{hh}$ connection, when the data arrives, calculating the real-time update of the middle layer neuron membrane potential:

$$V(t)=V(t-1)+f(W_{hx}U(t))+f(W_{hh}X(t-1))$$

Wherein, $f(W_{hx}U(t))$ is the current contribution of the input layer pulse to the post-synapses neuron, and $f(W_{hh}X(t-1))$ is the current contribution of the pulses fired in the past in the middle layer loop synapse to the current moment.

Calculating the output pulse $X_i(t)$ of the ith neuron in the middle layer:

$$X_i(t) = \begin{cases} 1, & V_i(t) \geq V_{thres} \\ 0, & V_i(t) < V_{thres} \end{cases},$$

Wherein, $V_{thres}$ is the membrane potential firing threshold, $V_i(t)$ is the membrane potential of the i-th neuron in the middle layer at time t, when the neuron membrane potential exceeds the threshold, a pulse is fired, then $V_i(t)=V_{rest}$ is set back to the resting voltage, waiting for the next accumulation-distribution event. In the present invention, $V_{thres}=0.15$.

In the present invention, the expression of the liquid state of the middle layer is realized by accumulating the pulse emission of the middle layer in the recent period of time. The expression formula of the middle layer liquid information R(t) is:

$$R(t) = X(t) + R(t-1)e^{-\frac{1}{\tau}}$$

Wherein, $\tau$ parameter is the decay factor, controlling the speed of trace decay, the smaller the $\tau$, the smaller the impact of the pulses fired in the past on the current moment. In the present invention, $\tau$ is 400.

In the classical liquid state machine, the output layer connection optimization is treated as a linear regression problem, and the least squares method is used to optimize the objective function. In the present invention, the optimization objective function using Ridge Regression:

$$J(W_{yh}) = \sum_t (Y(t) - W_{yh}R(t)) + \lambda_R \|W_{yh}\|_2^2$$

Wherein, $\Sigma_t(Y(t)-W_{yh}R(t))$ is used to reduce the deviation between the task objective and the prediction, and $\lambda_R\|W_{yh}\|_2^2$ is a penalty item, responsible for minimizing the variance of the parameter $W_{yh}$, $\lambda_R$ is the weight coefficient, which is used to control the proportion of penalty items and is responsible for balancing the prediction deviation and variance. In the present invention, $\lambda R=20$.

The trained connection weight $W_{yh}$ is fixed for real-time motion signal prediction:

$$Y(t)=W_{yh}R(t).$$

The use of ridge regression can significantly enhance the robustness of the model to noise and outliers (excessive traces) of spiking neural signals. Compared with the linear regression model, it has higher accuracy and ensures lower training computation.

In order to verify the feasibility of this method in the real motor area neural signal decoding task, as a special case, the performance of this model was tested in the monkey arm movement obstacle avoidance task experiment, and the two-dimensional movement trajectory of the monkey arm movement was predicted. In the experiment, an invasive device was used, and a rectangular electrode array was used to capture the dorsal premotor cortex (PMd) signal of the monkey brain, which was collected as a multi-channel discrete pulse sequence.

Figure 3:
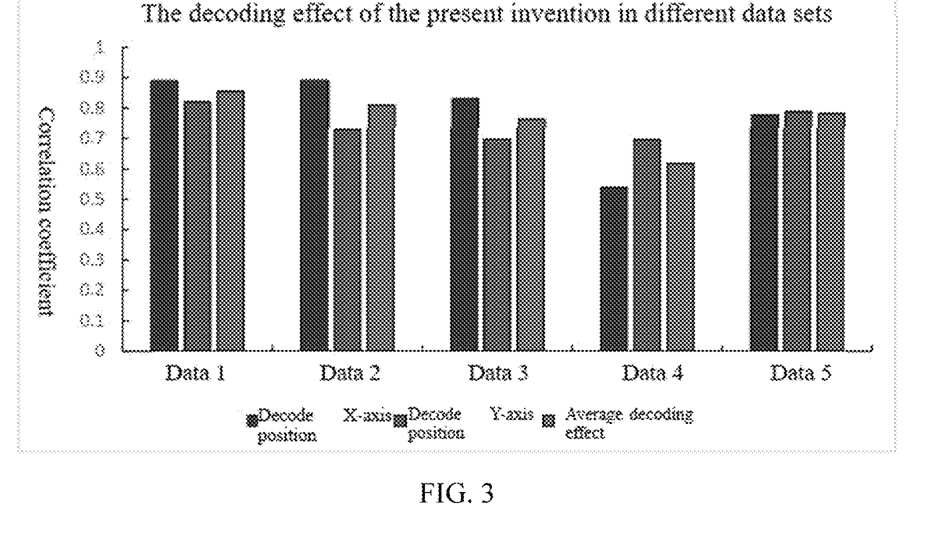
FIG. 3 is the decoding effect of the embodiment of the present invention on multiple test data.
Figure 4:
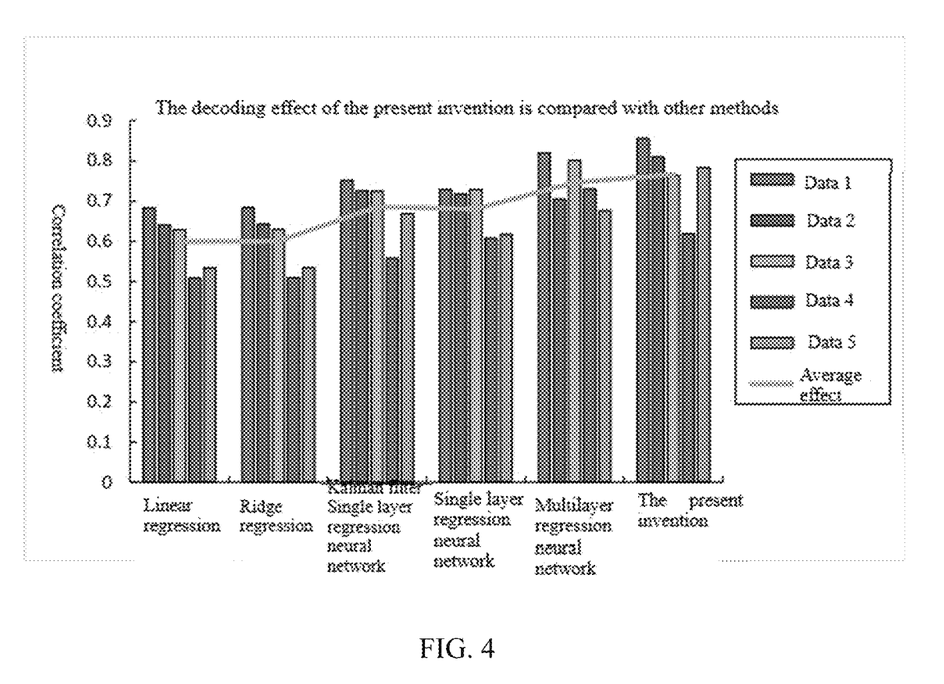
FIG. 4 is a comparison of decoding effects of various classical models and deep models in the method of the present invention.

The verification uses a total of five pieces of motion data, each piece of motion data intercepts data of the same duration and the same number of detection windows, which is convenient to compare with the fixed time window method in the classic frequency coding, and directly predict the arm coordinates (x, y), the predicted results use Pearson correlation to measure the decoding effect. The experimental results are shown in FIG. 3 and FIG. 4. The experimental results show that, on the basis of efficient training of shallow models, this method achieves a decoding accuracy that surpasses that of classical shallow model algorithms, and at the same time has a smaller decoding accuracy and close decoding effect than deep models such as RNN.

The above-mentioned embodiments describe the technical solutions and beneficial effects of the present invention in detail. It should be understood that the above-mentioned embodiments are only specific embodiments of the present invention, and are not intended to limit the present invention. Any modifications, additions and equivalent replacements made shall be included within the protection scope of the present invention.

The invention claimed is:

1. A brain machine interface decoding method based on a spiking neural network, wherein the method comprises the following steps:
   (1) constructing a liquid state machine model based on a spiking neural network, the liquid state machine model consists of an input layer, a middle layer and an output layer, wherein, a connection weight from the input layer to the middle layer is $W_{hx}$, a loop connection weight inside the middle layer is $W_{hh}$, a readout weight from the middle layer to the output layer is $W_{yh}$;

(2) inputting a neuron spike train signal, and training each weight with the following strategy:

(2-1) using Spile-timing-dependent plasticity (STDP) without supervision to train the connection weight $W_{hx}$ from the input layer to the middle layer; wherein in the step (2-1), using the trace of the pre- and post-neuron synapses to achieve STDP optimization the connection weight $W_{hx}$ from the input layer to the middle layer, the trace is the accumulation of the decaying pulse signal, and the formula is:

$$T_{pre}(t) = U(t) + T_{pre}(t-1)e^{-\frac{1}{\tau}}$$

$$T_{post}(t) = X(t) + T_{post}(t-1)e^{-\frac{1}{\tau}}$$

wherein, U and X are pulses fired by the input layer and middle layer, respectively, $T_{pre}(t)$ and $T_{post}(t)$ are the traces accumulated by the pre-synapse and the post-synapse at time t due to pulse firing, respectively, and T parameter is the decay factor, controlling the speed of trace decay when the trace is accumulated, the STDP algorithm using trace optimization is:

$$W_{hx}(i,j)=W_{hx}(i,j)-\text{lr}\times\Delta W_{hx}(i,j)$$

wherein, lr is the learning rate, the weight update amount $\Delta W_{hx}(i,j)$ between neurons i and j is:

$$\Delta W_{hx}(i,j) = \begin{cases} W_{hx}(i,j) - W_{min}, & W_{hx}(i,j) > 0 \text{ and } T_{pre} < T_{up} \\ W_{hx}(i,j) + W_{min}, & W_{hx}(i,j) < 0 \text{ and } T_{pre} < T_{up} \\ W_{hx}(i,j) - W_{max}, & W_{hx}(i,j) > 0 \text{ and } T_{pre} > T_{down} \\ W_{hx}(i,j) + W_{max}, & W_{hx}(i,j) < 0 \text{ and } T_{pre} > T_{down} \end{cases}$$

wherein, $T_{up}$ and $T_{down}$ are the upper and lower target values of the traces of the pre-synapses, respectively, $W_{max}$ and $W_{min}$ are the maximum/minimum value of the weight change caused by STDP optimization, and taking the maximum value of $W_{hx}$ and 0.0;

when the post-synapse neuron fires pulses, the traces of the pre-synapses are detected, when the current accumulated traces of the pre-synapses $T_{pre}(t)$ is greater than $T_{up}$, it is considered that there is a significant causal relationship between the pre-synapses pulse train and the post-synapse pulse firing in the current period of time, and enhance its corresponding weight, when the $T_{pre}(t)$ is lesser than $T_{up}$ it is considered that the pre-synapses is not directly related to the post-synapse pulse firing in the current period of time, and weaking the weight or disconnect;

(2-2) setting the loop connection weight $W_{hh}$ inside the middle layer by means of distance model and random connection, and obtaining a middle layer liquid information R(t); wherein, the specific process of step (2-2) is:

initializing the connection weight $W_{hh}$ as a two-dimensional matrix with a standard normal distribution:

$$W_{hh} \sim N(0,1)$$

scaling the normalized $W_{hh}$;

setting the pool in the middle layer as a three-dimensional structure, the pool is composed of multiple cubes with a side length of 1, each neuron is distributed at the vertex of the cube, then judging whether there is a connection based on the Euclidean distance between two points of the neuron, and breaking connection between distant neurons; wherein, the specific way to judge whether there is a connection based on the Euclidean distance between two points of the neuron is:

$W_{hh}$ is a square matrix in [N, N], wherein N is the number of neurons in the middle layer, and the element $w_{ij}$ defines the size of the connection between neuron j and neuron i, whether the connection between neurons i and j obeys probability:

$$p(i,j) = Ce^{-\frac{D(i,j)}{\lambda}}$$

wherein, the parameter λ defaults to 2, C defaults to 1.0, D(i,j) function is a distance function, which measures the distance between neurons i and j, using the square of the Euclidean distance, the formula is:

$$D(i,j)=(\text{pos}(i)-\text{pos}(j))^2;$$

(2-3) using the middle layer liquid information as an input, and using ridge regression with supervision to train the readout weight $W_{yh}$ from the middle layer to the output layer, and establishing a mapping between the middle layer liquid information R(t) and the output motion information, and finally outputting a predicted motion trajectory; wherein, the specific process of step (2-3) is:

when training the connection weight $W_{yh}$ from the middle layer to the output layer, fixing the generated input layer $W_{hx}$ and middle layer $W_{hh}$ connection; when the data arrives, calculating the real-time update of the middle layer neuron membrane potential:

$$V(t)=V(t-1)+f(W_{hx}U(t))+f(W_{hh}X(t-1))$$

wherein, $f(W_{hx}U(t))$ is the current contribution of the input layer pulse to the post-synapses neuron, and $f(W_{hh}X(t-1))$ is the current contribution of the pulses fired in the past in the middle layer loop synapse to the current moment;

calculating the output pulse $X_i(t)$ of the ith neuron in the middle layer:

$$X_i(t) = \begin{cases} 1, & V_i(t) \geq V_{thres} \\ 0, & V_i(t) < V_{thres} \end{cases},$$

wherein, $V_{thres}$ is the membrane potential firing threshold, $V_i(t)$ is the membrane potential of the i-th neuron in the middle layer at time t, when the neuron membrane potential exceeds the threshold, a pulse is fired, then $V_i(t)=V$ is set back to the resting voltage, waiting for the next accumulation-distribution event;

the expression formula of the middle layer liquid information R(t) is:

$$R(t) = X(t) + R(t-1)e^{-\frac{1}{\tau}}$$

wherein, τ parameter is the decay factor, controlling the speed of trace decay, the smaller the τ, the smaller the impact of the pulses fired in the past on the current moment;

the optimization objective function using ridge regression with supervision training is:

$$J(W_{yh}) = \sum_t (Y(t) - W_{yh}R(t)) + \lambda_R \|W_{yh}\|_2^2$$

wherein, $\Sigma_t(Y(t)-W_{yh}R(t))$ is used to reduce the deviation between the task objective and the prediction, and $\lambda_R\|W_{yh}\|_2^2$ is a penalty item, responsible for minimizing the variance of the parameter $W_{yh}$, $\lambda_R$ is the weight coefficient, which is used to control the proportion of penalty items and is responsible for balancing the prediction deviation and variance;

the trained connection weight $W_{yh}$ is fixed for real-time motion signal prediction:

$$Y(t)=W_{yh}R(t).$$

2. The brain machine interface decoding method based on a spiking neural network according to claim 1, wherein, the value of the decay factor $\tau$ is 4 times the time window value.

3. The brain machine interface decoding method based on a spiking neural network according to claim 1, wherein, the membrane potential firing threshold $V_{thres}=0.15$, the weight coefficient $\lambda_R=20$.

* * * * *